(No Model.)
A. F. MARTEL.
Car Brake.
No. 238,512. Patented March 8, 1881.
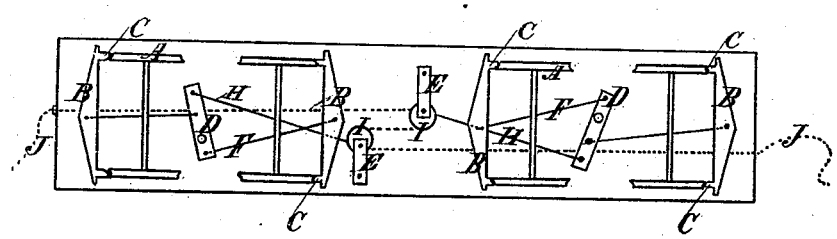
— FIG. 1. —
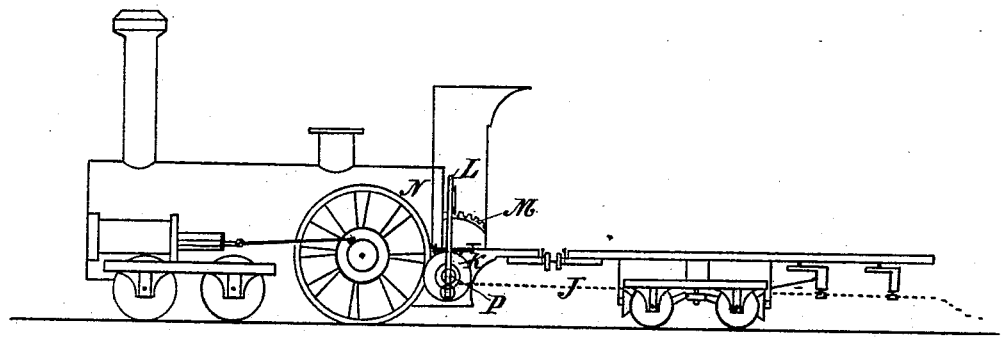
— FIG. 2. —
WITNESSES
A. F. Martel
INVENTOR.

UNITED STATES PATENT OFFICE.

ADÉLARD F. MARTEL, OF MONTREAL, QUEBEC, CANADA.

CAR-BRAKE.

SPECIFICATION forming part of Letters Patent No. 238,512, dated March 8, 1881.

Application filed September 1, 1880. (No model.)

*To all whom it may concern:*

Be it known that I, ADÉLARD FRANK MARTEL, of the city of Montreal, in the county of Hochelaga, in the Province of Quebec, Canada, railway-conductor, have invented certain new and useful Improvements in Car-Brakes; and I do hereby declare that the following is a full, clear, and exact description of the invention.

My invention has reference to an improvement on railway-car brakes by a continuous system, which can be used by the engine-driver or brakeman on the train. It is instantaneous in its action, and can be modified to suit the requirements of any kind of train.

Figure 1 is a plan of a car fitted with my invention. Fig. 2 is a side view of a locomotive and car, showing the frictional operating devices applied to the brake, and the connections of the chain under each car.

A are the car-wheels; B, the ordinary brake-bars; C, the shoes attached to the brake-bars B; D, the braking-lever; E, the pulley-carriers pivoted to the bottom of the car; F, the brake-rods; H, the connecting-rods. I are the tension-pulleys through which the chain is rove; J, the brake-chain, attached to the winch-barrel P, and rove through the pulleys I under each car. K is the friction-wheel on winch P, fitted with lever L, pivoted at its lower extremity to the side of the engine-frame, and attached to the axis of the winch-barrel P at a short distance from its attachment to the engine, and moving on a toothed sector, M, fitted with a stop, said lever being for the purpose of bringing the wheel K into frictional contact with the driving-wheel N of the locomotive, and thus cause the winch P to revolve and coil the chain J, which causes the pulleys I to close on one another, bringing the brakes in close and firm contact with the car-wheels A. The lever L is so fulcrumed that the least motion of the lever brings this friction-wheel K into contact with the driving-wheel N.

It is evident that the power of the engine, through its driving-wheel applied to winch P and winding in the chain, will have the effect, through pulleys I, the connecting-rods H, brake-rods F, and lever D, to draw the brakes together on the car-wheels A and stop the train; and it is also self-evident and desirable that such power should be under the immediate control of the engine-driver as well as the brakeman; and it is also clear that a brake of this kind is a necessity, as the excess of heat and cold often renders the steam-brake unreliable.

What I claim as my invention is—

The combination, in a car-brake, of the chain J, rove through the tension-pulleys I, pulley-carriers E, pivoted under the center of the car, rods H from the lever D to the pulley-carriers E, and attached, by chain J, to the winch-barrel P, provided with a friction pulley or wheel, K, lever L, and sector M, the whole arranged, as described, in connection with the driving-wheel of a locomotive-engine, substantially as set forth.

A. F. MARTEL.

Witnesses:
ARCHIBALD STEWART,
VIVIAN H. STEELE.